Nov. 22, 1966 B. N. GAON 3,287,567

LOWER-VALUE VOLTAGE LIMITER

Filed Sept. 30, 1963

INVENTOR.
BERNARD N. GAON

BY A. M. Fernandez

ATTORNEY 3,287,567
Patented Nov. 22, 1966

1

3,287,567

LOWER-VALUE VOLTAGE LIMITER

Bernard N. Gaon, Orange, Calif., assignor to North American Aviation, Inc.

Filed Sept. 30, 1963, Ser. No. 312,568
7 Claims. (Cl. 307—72)

This invention relates to a lower-value voltage limiter, and particularly to a sine wave, lower-value voltage limiter.

Amplitude limiting circuits have been employed in the past to translate to a load only that part of a signal above a predetermined reference level. The difficulty with prior art circuits is that the reference voltage signal is allowed to combine with the signal being translated to the load, thereby distorting the output signal. This is particularly a problem when the reference voltage varies in phase with the signal being translated, as when an amplitude modulated signal in phase with an A.C. reference signal is to be translated to a load without distortion and is not to go below the reference. Sharp limiting is not achieved if any of the reference voltage is allowed to combine with the signal being translated.

An object of this invention is to provide an improved lower-value voltage limiter with sharp limiting characteristics.

Another object is to provide an improved sine wave, lower-value, voltage limiter with sharp limiting characteristics.

These and other objects are achieved by a circuit in which a lower value limit is set by a comparator to which an input signal and a voltage reference are applied. When the input signal becomes equal to or less than the reference voltage, the reference is substituted as the output of the comparator until the input signal amplitude is again greater than the reference. In that manner the output signal follows the input signal until it goes below the reference. The comparator comprises a first pair of diodes connected to a first common junction, both being poled for conduction in the same direction with respect to the junction. A current limiting resistor couples the junction to a load; no other bias is provided in order to preserve the waveforms of the input signal and the reference voltage, and not allow the reference to combine with the input signal. For lower-value limiting of an input signal which may assume both positive and negative values, such as a sinusoidal signal, a second comparator connected to the input signal and voltage reference sources is provided comprising a pair of diodes poled oppositely to the first, each diode of the second pair being connected to a second common junction which is coupled by a second current limiting resistor to the load consisting of a low impedance summing network.

Other objects and advantages of the invention will become apparent from the following description with reference to the accompanying drawing in which.

Figure 1:
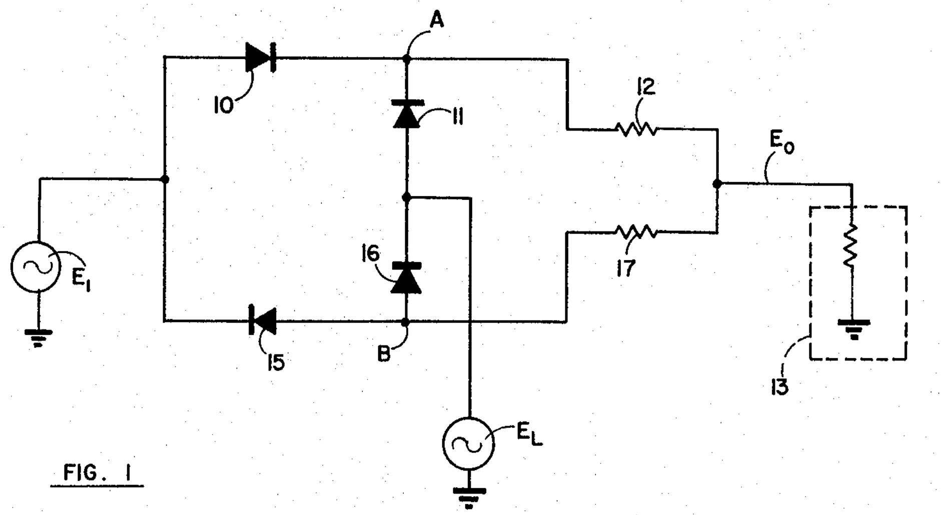
FIG. 1 is a circuit diagram of an embodiment of the invention.

Referring now to FIG. 1, a circuit is shown for limiting the lower value of a sinusoidal input signal $E_1$ with an in phase sinusoidal reference signal $E_L$ such that the output signal $E_O$ is not allowed to go below the reference signal regardless of how low the value of the input signal becomes, and to follow the input signal when it rises above the reference signal.

Figure 2:
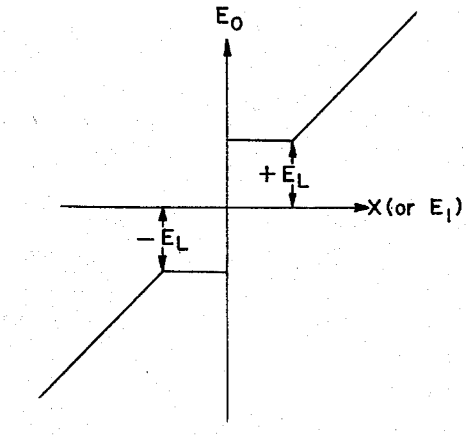
FIG. 2 is a diagram of the characteristics of the circuit in FIG. 1.

The operation of the circuit can best be understood by reference to the diagram of FIG. 2 which shows the

2 characteristics of the circuit. If the input signal $E_1$ varies as a function of X, it may be seen from the characteristics that the output signal $E_0$ will also vary as a linear function of X until the input signal becomes equal to or less than $E_L$.

The circuit of FIG. 1 which possesses the characteristics of FIG. 2 for positive values of X comprises a pair of diodes 10 and 11 having their cathodes connected to a common junction A and their anodes connected to the signal source $E_1$ and the reference signal $E_L$ respectively. A current limiting resistor 12 couples the junction A to a low impedance summing network 13.

The circuit portion of FIG. 1 which possesses the characteristics of FIG. 2 for negative values of X comprises a second pair of diodes 15 and 16 having their anodes connected to a common junction B and their cathodes to the signal source $E_1$ and the reference source $E_L$ respectively. A second current limiting resistor 17 connects the junction B to the low impedance summing network 13 so that the composite output signal $E_0$ is a linear function of $E_1$ for both positive and negative values of X except when $E_1$ as a function of X is equal to or less than $+E_L$ and $-E_L$ respectively; then, $E_0$ is a composite of the positive and negative values of $E_L$.

In the illustrated embodiment of the invention, the input signal $E_1$ is an amplitude modulated A.C. signal, and the reference $E_L$ is an A.C. signal of the same phase but of a constant amplitude. Both of the signals $E_1$ and $E_L$ are compared to produce a composite output $E_0$ as illustrated by the waveform diagram representing the operating characteristics of the invention for sinusoidal signals.

Figure 3:
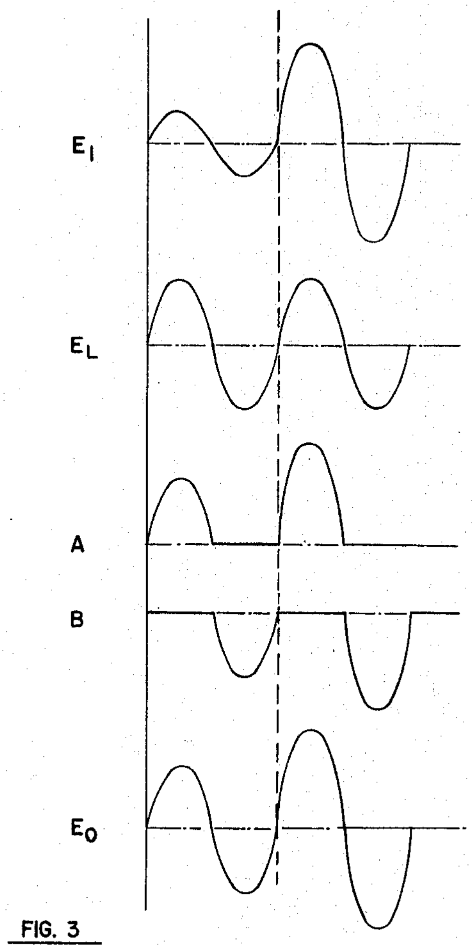
FIG. 3 is a waveform diagram representing the operating characteristics of the circuit in FIG. 1.

If two cycles of the input signal $E_1$ shown in FIG. 3 are compared with two cycles of the reference signal $E_L$, the waveforms A and B are produced at the respective junctions A and B of FIG. 1. During the first half of the first cycle, when $E_L$ is greater than $E_1$, the signal at the junction A is as illustrated by the waveform A during the same period while the signal at the junction B is 0 due to the positive signals applied to the cathodes of the diodes 15 and 16. During the second half of the first cycle, the signal at the junction A drops to 0 due to the negative signals applied to the anodes of the diodes 10 and 11 while the signal at the junction B follows the reference signal $E_L$. Thus, during that first cycle, only the diodes 11 and 16 conduct during the respective positive and negative half cycles of the reference signal $E_L$ because the reference signal $E_L$ is greater than the input signal $E_1$ thereby reverse-biasing the diodes 10 and 15.

During the first half of the second cycle, while $E_1$ is greater than $E_L$, only the diode 10 conducts, all other diodes are reverse-biased. The signal at the junction A will then have the value of the input signal $E_1$ as shown in the waveforms of FIG. 3. Similarly, during the second half of the second cycle only the diode 15 conducts. It should be noted that in the waveforms A and B of FIG. 3, the forward voltage drop of the conducting diodes is neglected since in most applications that voltage drop is negligible as compared to the amplitude of the input signal $E_1$ and the reference voltage $E_L$.

The output voltage $E_0$ is the composite or sum of the signals at the junctions A and B as shown in FIG. 3. For more precise summing of the signals at the junctions A and B, an operational amplifier with a negative feedback resistor connected between its output terminal and its input terminal may be substituted for the low impedance summing network 13, in which case the output signal would be inverted or equal to $-E_0$. In either case, the current limiting resistors 12 and 17 also function as summing resistors which may be so chosen as not to load the signal sources $E_1$ and $E_L$.

Since only one diode is conducting at any given time, and there is no other current path to the signal source $E_1$ or the reference source $E_L$, the output signal $E_0$ is not combined with either the input signal $E_1$ or the reference signal $E_L$, whichever has the lowest amplitude at the given time. Thus the output signal $E_0$ faithfully follows the input signal until the lower limits established by the reference signal $E_L$ is reached; thereafter, the output signal $E_0$ faithfully follows the reference signal $E_L$ regardless of how low the input signal $E_1$ becomes. Accordingly, the advantage of this invention is that there is no distortion of the output signal $E_0$.

Although the foregoing embodiment of the invention is as a single-phase limiter, a dual-phase limiter could be provided by adding a phase detector which controls the phase of the reference signal $E_L$ in accordance with the phase of the input signal $E_1$. There are many applications for this invention in control systems where lower-value limiting is necessary, both single-phase and dual-phase. One example of a single-phase application is in an aircraft flight control system where commanding an altitude below a predetermined value would be detrimental. For instance, the input signal $E_1$ may be an amplitude modulated A.C. command signal for altitude which is to be used by a flight control computer to produce flight control signals for automatically achieving the commanded altitude. The reference signal $E_L$ may then be an amplitude modulated signal representing an altitude such as 250 feet below which it is not desired to fly the aircraft regardless of what input command signal is applied. An example of a dual phase application is in a control system for hydrofoil marine vessels where $E_1$ is an amplitude modulated altitude command signal of one phase for greater altitude and of an opposite phase for lesser altitude, and the reference signal $E_L$ represents the maximum diving command signal of either phase which the system may carry out without causing the hydrofoils to break out through the surface of the water or the hull to impinge the surface of the water.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A lower value voltage limiter comprising
one pair of unidirectional conducting devices connected to one common junction, each device having two terminals and being poled for forward conduction in the same direction with respect to said one junction,
a current limiting resistor coupling said common junction to a load,
one of said devices adapted to be connected to an input signal source tending to provide conduction of current therethrough at least part of the time,
and a reference signal source connected to the other of said devices tending to provide current therethrough at least during the time said input signal tends to provide current through said one device, whereby current is provided to said low impedance summing network from said input signal source or said reference signal source, whichever is greater in amplitude.

2. A lower value voltage limiter as defined by claim 1 further comprising
a second pair of unidirectional conducting devices connected to a second common junction, each having two terminals and being poled for forward conduction of current in the opposite direction with respect to current through said one pair of devices,
a second current limiting resistor coupling said second common junction to said load, said load comprising a low impedance current summing network,
one device of said second pair having its second terminal connected to said signal source and the other device of said second pair having its second terminal connected to the reference signal source, whereby lower value voltage limiting of either polarity is provided.

3. A lower value voltage limiter as defined by claim 1 wherein said devices comprise junction diodes.

4. A lower value voltage limiter as defined by claim 2 wherein said devices comprise junction diodes.

5. A lower value voltage limiter comprising
a pair of diodes having like first terminals connected to a junction,
a resistor coupling said junction to a load,
a second terminal of a first one of said pair of diodes adapted to be connected to a first signal source, and
a second signal source connected to a second terminal of a second one of said pair of diodes, whereby said load receives a signal at any given time from either said first signal source or said second signal source, whichever is greater in amplitude at said given time.

6. A lower value voltage limiter comprising
a first pair of diodes, each having its cathode connected to a first junction,
a second pair of diodes, each having its anode connected to a second junction,
a pair of resistors, each coupling one of said junctions to a common terminal of load,
a first signal source having an output terminal connected to the anode of one of said first pair of diodes and to the cathode of one of said second pair of diodes, and
a second signal source having an output terminal connected to the anode of the other of said first pair of diodes and to the cathode of the other of said second pair of diodes.

7. In an apparatus for limiting the lower value of a voltage signal being translated to a load, the combination comprising
diodes associated in pairs,
an alternating input signal source connected respectively to the cathode of a first one of said diodes and to the anode of a second one of said diodes,
a reference signal source connected respectively to the cathode of a third one of said diodes, and to the anode of a fourth one of said diodes,
a first coupling resistor connected in series between the cathodes of said second and fourth diodes and said load, and
a second coupling resistor connected in series between the anodes of said first and third diodes and said load.

References Cited by the Examiner

UNITED STATES PATENTS

| | | | |
|---|---|---|---|
| 2,521,522 | 9/1950 | Keitley | 324—140 X |
| 2,727,999 | 12/1955 | Rusler | 324—140 X |
| 3,025,414 | 3/1962 | McVey | 324—140 X |
| 3,029,386 | 4/1962 | Ricker | 324—87 |
| 3,068,411 | 12/1962 | Galman | 324—87 X |
| 3,075,086 | 1/1963 | Mussard. | |
| 3,214,680 | 12/1965 | Kroll. | |

ORIS L. RADER, *Primary Examiner.*

T. J. MADDEN, *Assistant Examiner.*